United States Patent
Ferrari

(10) Patent No.: US 8,118,265 B2
(45) Date of Patent: Feb. 21, 2012

(54) DEVICES AND METHODS TO IMPROVE WING AERODYNAMICS AT LOW AIRSPEEDS

(75) Inventor: Marcello do Areal Souto Ferrari, Sao Jose dos Campos (BR)

(73) Assignee: Embraer S.A., São José Dos Campos - SP (BR)

(*) Notice: Subject to any disclaimer, the term of this patent is extended or adjusted under 35 U.S.C. 154(b) by 337 days.

(21) Appl. No.: 12/367,059

(22) Filed: Feb. 6, 2009

(65) Prior Publication Data

US 2009/0314898 A1    Dec. 24, 2009

Related U.S. Application Data

(63) Continuation-in-part of application No. PCT/BR2007/000202, filed on Aug. 8, 2007.

(30) Foreign Application Priority Data

Aug. 8, 2006 (BR) .................................. 0603262

(51) Int. Cl.
B64C 3/58 (2006.01)

(52) U.S. Cl. .................... 244/214; 244/199.1; 244/204.1

(58) Field of Classification Search .................. 244/198, 244/199.1, 204.1, 214, 199.4, 199.2
See application file for complete search history.

(56) References Cited

U.S. PATENT DOCUMENTS

| | | | | |
|---|---|---|---|---|
| 3,195,836 A | * | 7/1965 | Alvarez-Calderon | 244/216 |
| 3,375,998 A | * | 4/1968 | Alvarez-Calderon | 244/210 |
| 4,032,087 A | * | 6/1977 | Cleaves | 244/214 |
| 4,384,693 A | * | 5/1983 | Pauly et al. | 244/207 |
| 4,598,885 A | | 7/1986 | Waitzman | |
| 4,702,441 A | * | 10/1987 | Wang | 244/204 |
| 4,739,957 A | | 4/1988 | Vess et al. | |
| 5,056,741 A | * | 10/1991 | Bliesner et al. | 244/214 |
| 5,249,762 A | | 10/1993 | Skow | |
| 5,738,298 A | * | 4/1998 | Ross et al. | 244/1 N |
| 6,152,404 A | | 11/2000 | Flaig et al. | |
| 6,454,219 B1 | * | 9/2002 | Moe | 244/214 |
| 7,753,316 B2 | * | 7/2010 | Larssen et al. | 244/199.4 |
| 2008/0265102 A1 | * | 10/2008 | Larssen et al. | 244/203 |
| 2010/0219288 A1 | * | 9/2010 | Larssen et al. | 244/1 N |
| 2011/0049305 A1 | * | 3/2011 | Kafyeke et al. | 244/214 |

FOREIGN PATENT DOCUMENTS

WO    WO 2008/017134    2/2008

OTHER PUBLICATIONS

Written Opinion of the International Searching Authority for PCT/BR07/00202, mailed Jul. 2, 2008.

* cited by examiner

Primary Examiner — Benjamin P Lee
(74) Attorney, Agent, or Firm — Nixon & Vanderhye P.C.

(57) ABSTRACT

Aircraft wings are provided with aerodynamic devices that improve the wing's low airspeed aerodynamics. In preferred embodiments, the aircraft wings include a slat operatively positioned at the wing's leading edge for movement between a retracted position for relatively high airspeed aircraft operations, and a deployed position for relatively low airspeed aircraft operations. An aerodynamic device is positionally fixed to the wing laterally adjacent the leading edge slat, the device having a forward end extending forwardly of the wing leading edge. The device is operable in response to movement of the slat into the deployed position thereof so as to improve the aerodynamics of the wing at low airspeed aircraft operations, but provides substantially no aerodynamic improvement when the slat is in the retracted position thereof during high airspeed aircraft operations.

9 Claims, 4 Drawing Sheets

DEVICES AND METHODS TO IMPROVE WING AERODYNAMICS AT LOW AIRSPEEDS

CROSS-REFERENCE TO RELATED APPLICATION

This application is a continuation-in-part (CIP) of prior filed International Application PCT/BR2007/000202 filed Aug. 8, 2007 (published on Feb. 14, 2008 as WO 2008/017134) which is based on and claims priority benefits from Brazilian Application No. PI0603262-1 filed Aug. 8, 2006, the entire content of each prior filed application being incorporated herein expressly by reference.

TECHNOLOGICAL FIELD

In a typical mission, an aircraft can operate within several airspeed envelopes depending on the phase of flight. During the cruise phase of flight, an aircraft is typically operated within its higher airspeed envelope. During other non-cruise phases of flight, for example, the aircraft may be operated within much lower airspeed envelopes. By way of example, during the aircraft's take-off phase through its climb profile and/or during an in-flight holding (e.g., a situation where the aircraft orbits a navigational fix waiting for permission from Air Traffic Control (ATC) to land at its destination airport), the aircraft may be operated within its intermediate airspeed envelope. During the landing phase of flight, however, the aircraft typically operates within its lowest airspeed envelope that may in fact be somewhat above the aircraft's stall speed by a predetermined airspeed safety factor. It is desirable therefore that an aircraft also operate efficiently at such low airspeeds because that allows it to land under safer conditions while also providing an opportunity for the aircraft to land at a greater number of possible runways (e.g., since stable low airspeeds at landing permit the aircraft to land on the shortest possibly runways).

As the aircraft's operational airspeed diminishes, however, an aerodynamic degradation occurs along the aircraft wing which adversely affects the ability of the wing to sustain sufficient lift. In order to counter such adverse low airspeed aerodynamics, therefore, the art has proposed a variety of aerodynamic devices whose function is to delay the onset of that lift degradation and thereby allow the aircraft to operate safely at relatively low airspeeds. For example, it has been proposed to fix vortex generators at or near the leading edge of a wing and/or in the canopy/cockpit area as well as to provide aerodynamic fences attached to locations on the wing and/or engine nacelles as variations of devices to improve the low airspeed handling characteristics of aircraft.

It has been proposed in U.S. Pat. No. 6,152,404 (incorporated fully hereinto by reference to provide an aerodynamic device (colloquially known as a "fence") fastened to the slat on the leading edge of an aircraft wing so that when the slat is deployed, the fence moves in tandem with the slat. While the US '404 patent discloses variations in the fence geometries, all such variations are fixed to and thus move in conjunction with the leading edge wing slat.

Other proposals exist in U.S. Pat. Nos. 4,598,885, 4,739,957, and 5,249,762 (each incorporated fully hereinto by reference). The US '885 patent, for example, discloses a fixed-position aerodynamic fence which extends continuously between the leading and trailing edges of the aircraft wing outboard of the splines and flaps. The fence prevents or substantially minimized lateral flow which tends to produce vortex turbulence. As such, the fence functions independently of the deployment of the splines and/or flaps.

It would therefore be highly desirable if devices could be provided which functions only when a leading edge slat is deployed so that the aircraft wing inboard of the device functions nominally at relatively high airspeeds (e.g., during cruise flight) while inboard vortices are formed by the device during relatively low airspeeds (e.g., during approach and landing). It is towards fulfilling such needs that the present invention is directed.

BACKGROUND AND SUMMARY

Aircraft wings are provided with aerodynamic devices that improve the wing's low airspeed aerodynamics. In preferred embodiments, the aircraft wings include a slat operatively positioned at the wing's leading edge for movement between a retracted position for relatively high airspeed aircraft operations, and a deployed position for relatively low airspeed aircraft operations. An aerodynamic device is positionally fixed to the wing laterally adjacent the leading edge slat, the device having a forward end extending forwardly of the wing leading edge. The device is operable in response to movement of the slat into the deployed position thereof so as to improve the aerodynamics of the wing at low airspeed aircraft operations, but provides substantially no aerodynamic improvement when the slat is in the retracted position thereof during high airspeed aircraft operations.

The device is preferably positionally fixed to the wing adjacent an inboard edge of the slat. In especially preferred embodiments, the device is positionally fixed to the wing between the inboard edge of the slat and a wing-fuselage fairing.

The device according to certain implementations is preferably in the form of a substantially planar structure having arcuately rounded upper and lower edges. In this regard, some embodiments will include a device wherein each of the upper and lower edges is arcuately rounded about a radius of curvature that is substantially the same. Alternatively, the device may have asymmetrically curved upper and lower edges, that is wherein each of the upper and lower edges is arcuately rounded about a radius of curvature that is different. In such an embodiment the radius of curvature of the bottom edge is preferably greater than the radius of curvature of the upper edge.

These and other features and advantages will be better and more completely understood by referring to the following detailed description of exemplary non-limiting illustrative implementations in conjunction with the drawings.

BRIEF DESCRIPTION OF THE DRAWINGS

An exemplary non-limiting illustrative implementation of the herein disclosed subject matter will be further explained by reference to the drawings of which.

DETAILED DESCRIPTION

The aerodynamic fences of the present invention function to allow the aircraft to operate more safely during low airspeed conditions, such as during the approach and landing phases of flight. The fences generate an aerodynamic vortex that passes over the wing providing desirable characteristics to the air flow on the wing area. It is known that, as the operational angle of attach of an aircraft increases in flight, adverse pressure gradients will exist on the external wing surface which increase towards the wing's trailing edge thereby making the air flow along the wing in such an area prone to suffering aerodynamic loss. When aerodynamic loss begins, the wing's lifting capacity is compromised thereby potentially adversely affecting continued flight in such a regime. The aerodynamic fences of the present invention therefore function so as to create beneficial vortices with the wing's leading edge slats deployed thereby postponing the onset of aerodynamic loss and thus maintaining the wing's lifting capabilities during relative low airspeed operations.

Figure 1:
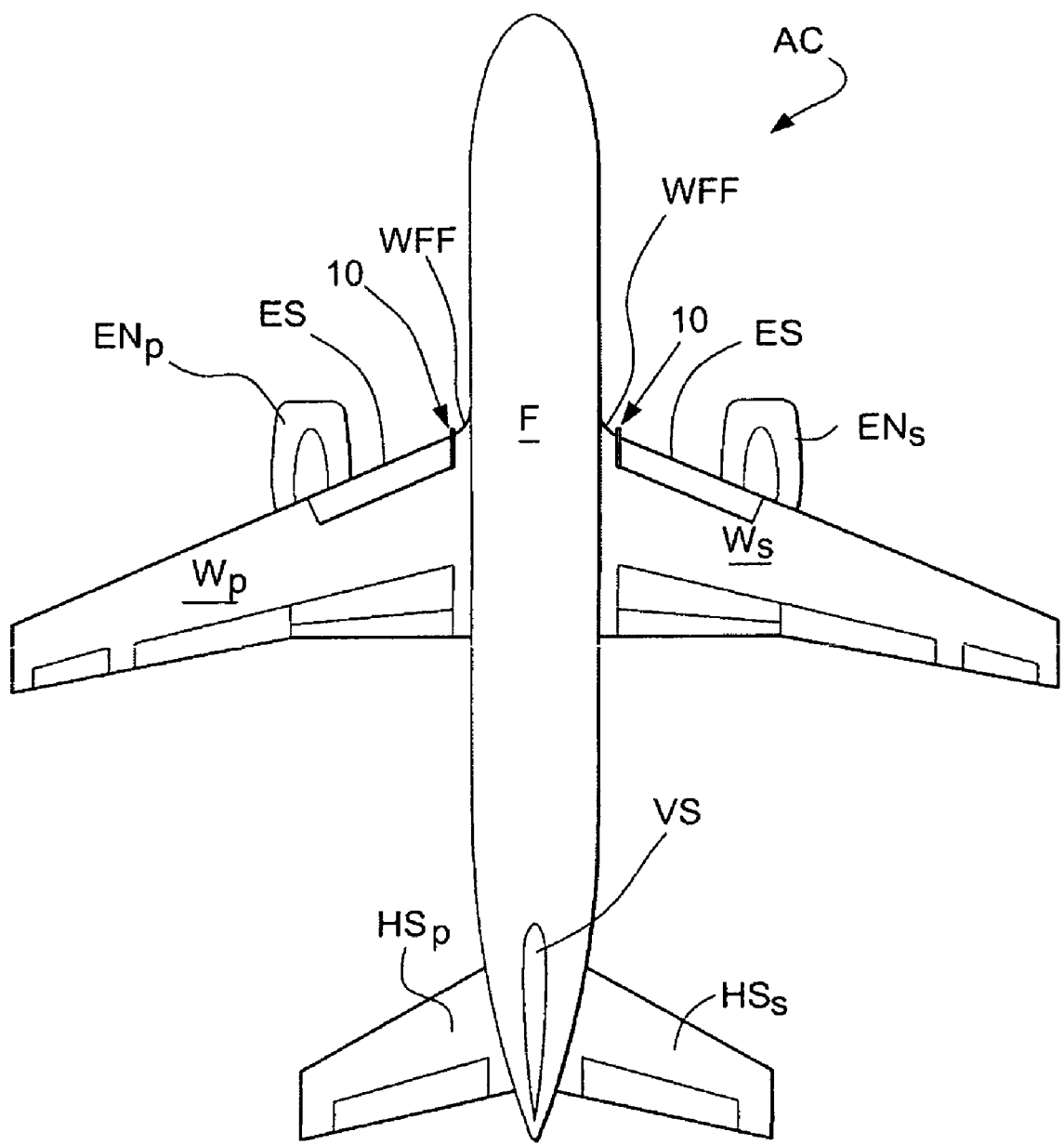
FIG. 1 is schematic top plan view of a fixed wing aircraft which includes an embodiment of an aerodynamic fence of the present invention.

Accompanying FIG. 1 schematically shows a top view of an exemplary fixed wing aircraft AC having a fuselage F, a vertical stabilizer VS and port and starboard horizontal stabilizers HSp and HSs, respectively. The aircraft AC also includes leading edge slats ES on its port and starboard wings Wp and Ws, respectively. As can be seen, aerodynamic fences 10 according to an embodiment of the present invention are position ally fixed adjacent respective inboard edges of the leading edge slats ES near the wing fuselage fairings WFF. Port and starboard engine nacelles ENp and ENs, respectively, house turbine engines to provide sufficient thrust for the airplane.

Figure 2A:
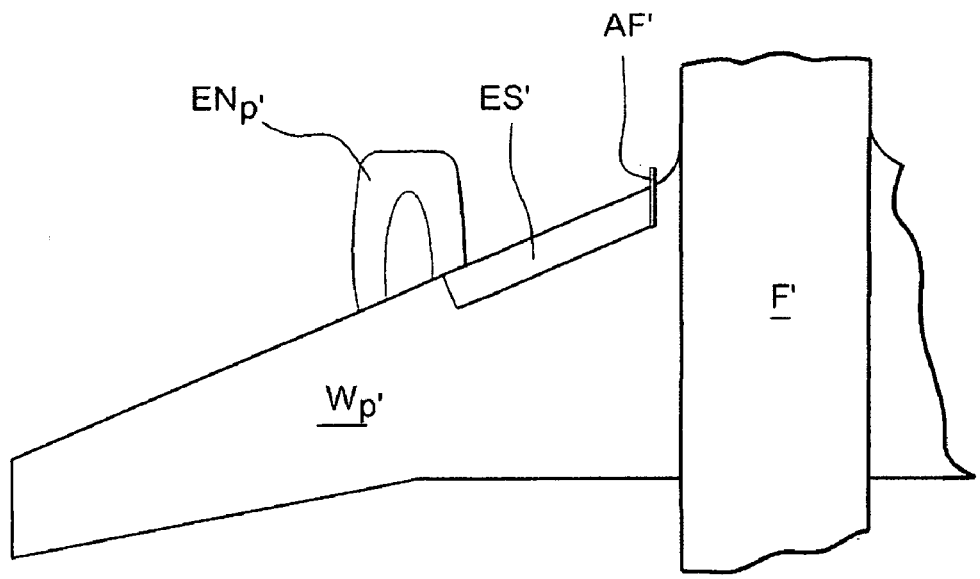
FIGS. 2a and 2b are schematic top plan views of a port wing section which includes a prior art aerodynamic fence fixed to an inboard lateral edge of a leading edge wing slat, the fence being moveable with the slat between its retracted position (FIG. 2a) and its extended or deployed position (FIG. 2b.
Figure 2B:
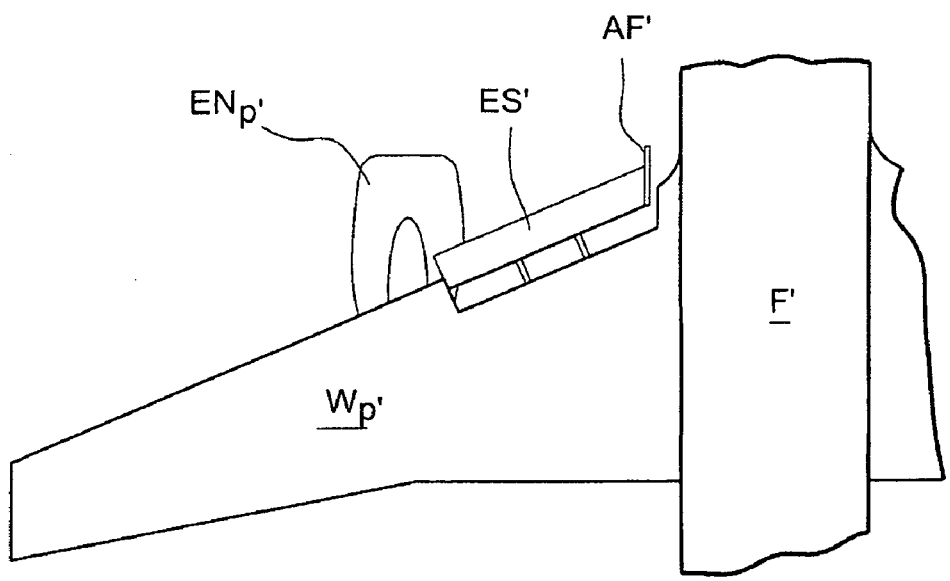

FIGS. 2a and 2b depict top plan schematic views of an aerodynamic fence AF' associated with the port wing Wp', it being understood that a similar fence AF' would likewise be provided symmetrically with respect to the starboard wing Ws'. As is shown, the fence AF' is position ally fixed to an inboard edge of the leading edge slat ES' inboard of the port engine nacelle ENp'. As shown in FIG. 2a, therefore, the edge slat ES' is in its retracted position, while in FIG. 2b, the edge slat ES' is in its extended or deployed position wherein it is extended outwardly and downwardly relative to the leading edge of the port wing Wp'. In the extended position of FIG. 2b, therefore, it will be observed that the conventional aerodynamic fence AF' of fence type is movable as an integral unit with the edge slat ES' (i.e., since the fence AF' is physically attached to and thus movable with the edge slat ES').

Figure 3A:
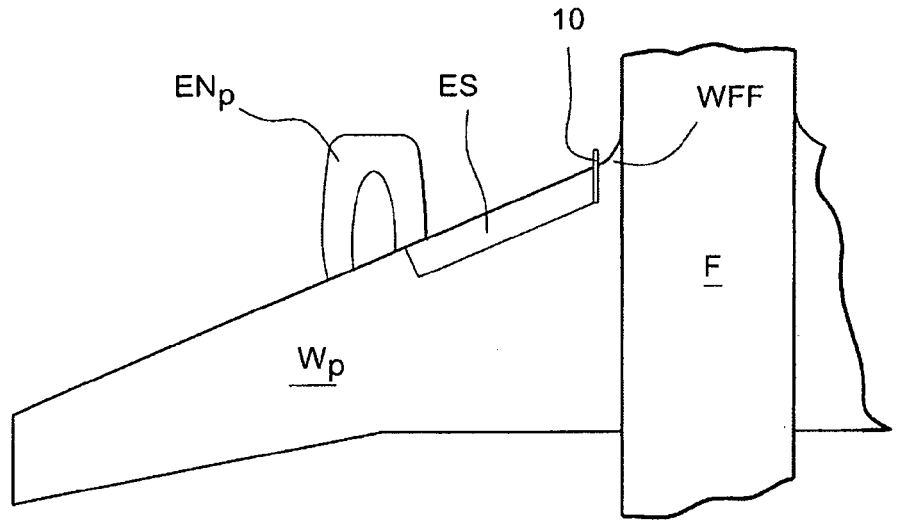
FIGS. 3a and 3b are schematic top plan views of a port wing section which includes an aerodynamic fence according to an embodiment of the present invention fixed to a leading edge of the wing adjacent to a leading edge wing slat, the fence remaining in a fixed position relative to the wing slat when the slat is moved between its retracted position (FIG. 3a) and its extended or deployed position (FIG. 3b)
Figure 3B:
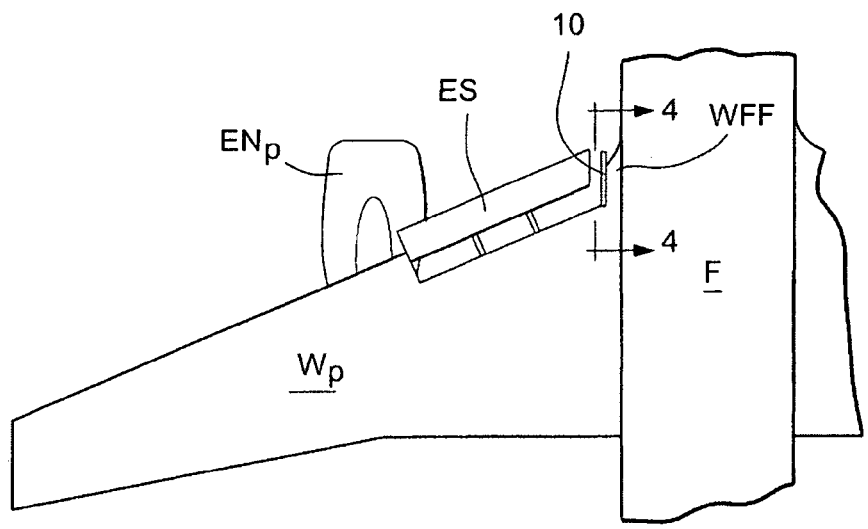

An aerodynamic fence 10 in accordance with an embodiment of the present invention is shown in FIGS. 3a and 3b as a component part of the port wing Wp of the aircraft AC (it being understood that a similar aerodynamic fence 10 would be provided symmetrically as a component part of the starboard wing Ws). Specifically, FIG. 3a shows an aerodynamic fence 10 according to the present invention in relation to a leading edge slat ES on the port wing Wp, the edge slat ES being in its retracted (inoperative) position. While in such a position, the aerodynamic fence 10 presents a similar appearance as compared to the conventional aerodynamic fence F' with the edge slat ES' in its retracted position as shown in FIG. 2a. However, since the edge slat 10 according to an embodiment of the present invention is position ally fixed to the structures of the port wing Wp immediately adjacent an inboard edge of the edge slat ES, the fence 10 will remain in position during deployment of the edge slat ES (i.e., movement of the edge slat from its retracted position as shown in FIG. 3a to its extended position as shown in FIG. 3b). Thus, contrary to the aerodynamic fence AF' of the prior art, the edge slat 10 according to an embodiment of the present invention as depicted in FIGS. 3a and 3b will remain position ally fixed to the wing and does not move as a unit with the edge slat ES when it is deployed.

Figure 4:
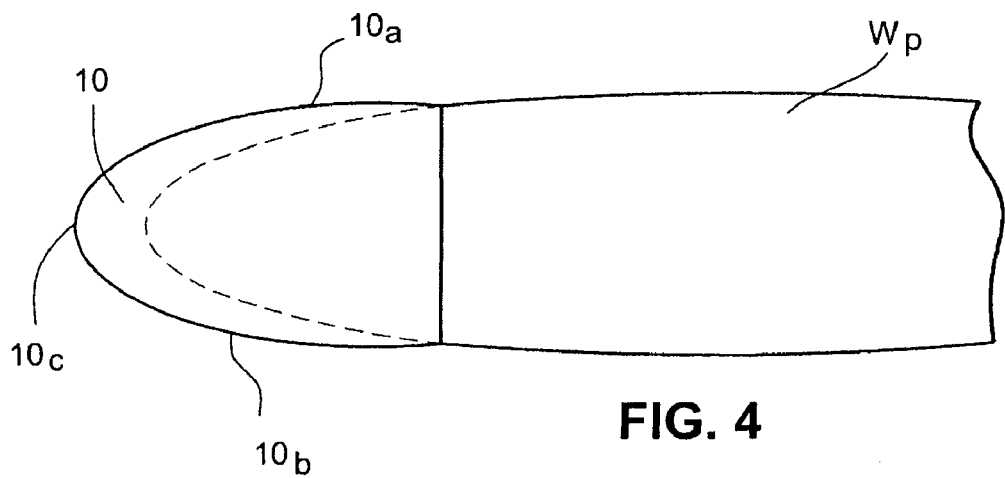
FIG. 4 is a schematic cross-sectional view of the port wing section which includes an aerodynamic fence according to an embodiment of the present invention as taken along line 4-4 in FIG. 3b.

Accompanying FIG. 4 depicts an enlarged cross-sectional view of the aerodynamic fence 10 fixed to the port wing Wp. As is shown, the aerodynamic fence 10 is essentially a planar structure that is fixed to the wing Wp so as to be immediately adjacent to an inboard edge of the leading edge wing slat ES (see FIG. 3a) at its junction with the wing fuselage fairing WFF (i.e., at the wing root where it joins the fuselage F). In the embodiment shown, the fence 10 is symmetrically curved along its top and bottom edges 10a, 10b, respectively, around substantially the same radii of curvature. The apical forward end 10c of the fence 10 extends a distance D beyond the leading edge of the wing Wp. The aft end 10d of the fence 10 is abutted against a wing spar (not shown) for purpose of support.

It will be understood that the aerodynamic fence could be provided in other alternative forms. For example, the upper and lower edges 10a, 10b could be asymmetrically curved around differently dimensioned radii. Thus, the lower edge 10b may be curved around a radius which is of a lesser dimension as compared to the greater radius dimension of curvature of the upper edge 10a.

Figure 5:
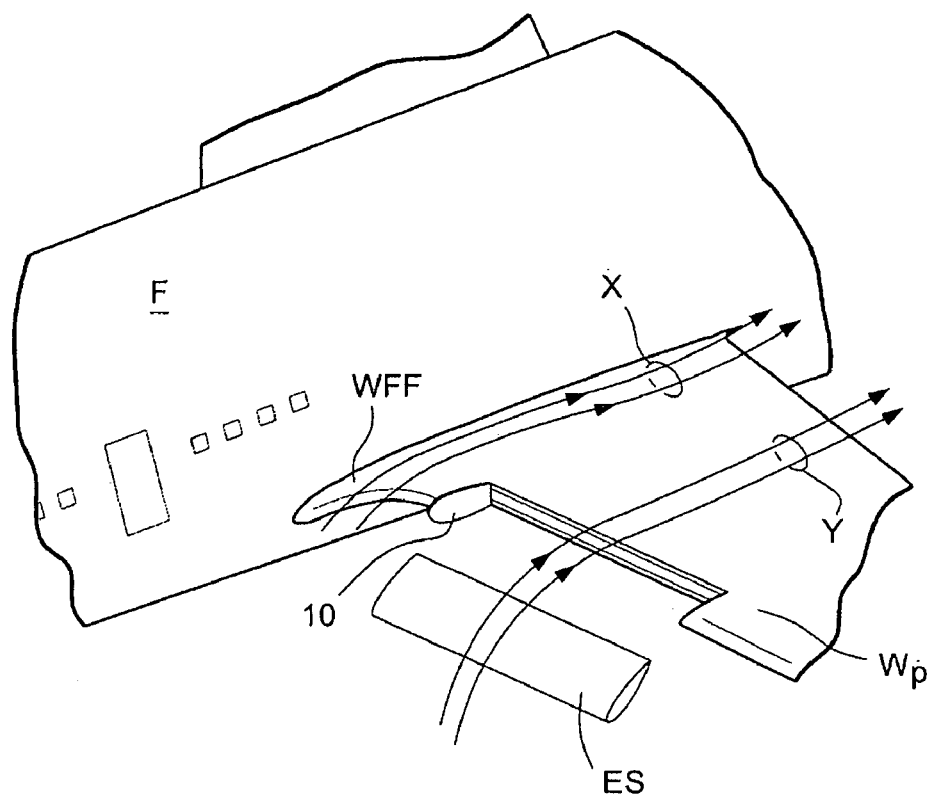
FIG. 5 is a schematic port-side perspective view which graphically depicts the airflow vortices formed by the aerodynamic fence depicted in FIGS. 3a and 3b when the leading edge wing slat is deployed.

Accompanying FIG. 5 depicts schematically the functional effect of the aerodynamic fence 10 in accordance with the embodiment of the invention as described previously. In this regard, the aerodynamic fence 10 of the present invention causes an aerodynamic vortex acting on extra-dorsum (upper surface area) of the wing Wp which thereby creates a stronger adverse gradient of pressure without the occurrence of aerodynamic loss.

When aerodynamic air flow occurs, it is noticed that a threshold layer is formed along the whole surface of the aircraft AC. The proximity of the fuselage F to the wings Wp, Ws causes a confluence of two threshold layers, namely, a layer on extra-dorsum of the wings Wp, Ws and another layer on the wing-fuselage fairings WFF. The resulting air flow threshold layer is thus made thicker and prone to suffer aerodynamic loss. The fence 10 in accordance with the embodiments of the present invention is therefore an efficient solution to address the problems due the airflow confluence in the area close to the intersection of the wings Wp, Ws and the aircraft's fuselage F in the vicinity of the fairings WFF.

In this regard, it will be seen in the schematic representation of FIG. 5 that the airflow (lines X) graphically represent the vortex formed on the upper surface of the wing Wp by virtue of the fence 10 according to an embodiment of the present invention when the edge slat ES is deployed. The graphically depicted vortex allows for undisturbed air flow (lines Y) over the upper surface of the wing Wp near the wing's leading edge slat ES to be directed closer to the upper surface of the wing Wp and remain in proximity to such surface between the leading and trailing wing edges. This airflow pattern thereby alters favorably the profile of the threshold layer in the area Z of the wing thus making it more resistant to the aerodynamic loss. As a result, the aircraft AC is capable of achieving greater angles of attack without suffering a wing stall condition. Stated another way, the aircraft can be operated within its low airspeed envelope with a greater safety margin above wing stall thereby allowing for optimum landing characteristics. It is also important to observe that the effectiveness of the aerodynamic fence 10 according to the present invention is functional in the manner described previously only when the slat ES is in its extended or operational position as shown in FIG. 3b. Thus, with the edge slat ES in its retracted (inoperative) position as shown in FIG. 3a, the fence 10 will likewise substantially inoperative. Thus, with the edge slat ES retracted, the wing Wp will function efficiently at the higher operational airspeeds with virtually no airflow alteration by the fence 10.

The fence 10 according to the embodiment of the invention described previously has been proven through wind tunnel testing to establish its operation and high lift efficiency which significantly improves the aircraft performance at low airspeeds. Particularly, there has been observed a significant improvement of the maximum coefficient of lift as compared to the known aerodynamic fences AF'. Furthermore, wind tunnel testing comparing an aircraft without any fences with the same aircraft having the fences AF' of the prior art and the fences 10 according to the present invention showed a comparable percentile improvement in the coefficient of lift between the fences 10 of the present invention and the fences AF' of the prior art as compared to the aircraft without such fences.

However, substantial weight penalties are avoided by means of the fences 10 according to the present invention. In this regard, it will be appreciated that the fences 10 according to the present invention are not fastened to the movable edge slat ES. As a result, the edge slat's actuation system and support structures do not need to be strengthened to accommodate the attached fence and its associated aerodynamic loads when the edge slat is deployed. Thus, the actuation systems and support structures of the edge slats ES can be made lighter and less complex when an aircraft wing embodies an aerodynamic fence 10 according to the present invention since its fixation onto the wing structure can be accomplished more simply and requires much less structural reinforcement. In addition, the wing fuselage fairing WFF to which the aerodynamic fence 10 is fixed is a more rigid structure (e.g., as compared to the edge slat ES) and thus the potential for structural damage to the fence 10 due to airflow interaction phenomena, such as flutter or divergence, is significantly reduced.

Moreover, an anti-ice heating system so as to combat problems of in-flight ice formation will be simpler to implement for the fence 10 of the present invention as it is fixed to the aircraft wing structure. As such, the wing's conventional bleed air anti-icing system can be more readily modified to provide anti-icing protection to the fence 10. The simpler structural attachments of the fence 10 also promote simpler maintenance.

The fence 10 may be employed as an original equipment component for new aircraft as well as to retrofit existing fleet aircraft. Thus, because the fence 10 is position ally fixed directly to the rigid structural support structures of a wing, it can be readily installed on existing aircraft.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An aircraft wing having leading and trailing edges comprising:
   a slat operatively positioned at an outboard portion of the aircraft wing adjacent to an inboard portion of the aircraft wing, wherein the slat establishes a respective outboard leading edge portion of the aircraft leading edge adjacent to an inboard leading edge portion of the aircraft leading edge, and wherein the slat is moveable between a retracted position for relatively high airspeed aircraft operations wherein the inboard and outboard leading edge portions of the aircraft leading edge are aligned with one another, and a deployed position for relatively low airspeed aircraft operations wherein the outboard portion of the aircraft leading edge established by the slat is displaced forwardly of the inboard leading edge portion of the aircraft wing; and
   an aerodynamic device positionally fixed to the inboard portion of the aircraft wing laterally adjacent an inboard edge of the slat at a location between the inboard and outboard portions of the aircraft wing, the aerodynamic device having a forward end extending forwardly of the aligned inboard and outboard leading edges of the inboard and outboard portions of the aircraft wing, respectively, when the slat is in the retracted position thereof, wherein
   the aerodynamic device is operable in response to movement of the slat into the deployed position thereof so as to improve the aerodynamics of the wing at low airspeed aircraft operations, and providing substantially no aerodynamic improvement when the slat is in the retracted position thereof during high airspeed aircraft operations.

2. The aircraft wing as in claim 1, wherein the device is positionally fixed to the wing between the inboard edge of the slat and a wing-fuselage fairing which establishes the inboard portion of the aircraft wing.

3. The aircraft wing as in claim 1, wherein the device is a substantially planar structure having arcuately rounded upper and lower edges.

4. The aircraft wing as in claim 3, wherein each of the upper and lower edges is arcuately rounded about a radius of curvature that is substantially the same.

5. The aircraft wing as in claim 3, wherein each of the upper and lower edges is arcuately rounded about a radius of curvature that is different.

6. The aircraft wing as in claim 5, wherein the bottom edge of the device is curbed about a radius of curvature which is greater as compared to the radius of curvature of the upper edge.

7. A method to improve low airspeed aerodynamics of an aircraft wing having leading and trailing edges, the method comprising:
   positionally fixing a planar aerodynamic device to the wing to an inboard portion of an aircraft wing laterally adjacent to a leading edge slat which defines an outboard portion of the aircraft wing so that the device is immovably positioned relative to the inboard portion of the aircraft wing during movement of the slat between a retracted position wherein inboard and outboard leading edge portions of the aircraft leading edge associated with the inboard and outboard portions of the aircraft wing, respectively, are aligned with one another whereby substantially no aerodynamic improvement of airflow over the aircraft wing between the leading and trailing edges thereof occurs, and a deployed position thereof wherein the outboard portion of the aircraft leading edge established by the slat is displaced forwardly of the inboard leading edge portion of the aircraft wing wherein improvement to airflow over the aircraft wing between the leading and trailing edges thereof occurs, and causing the device to improve airflow over the wing between the leading and trailing edges thereof by moving the slat into the deployed position thereof.

8. A method according to claim 7, wherein the device is positionally fixed to the wing adjacent to an inboard edge of the slat.

9. A method according to claim 7, wherein the device has a forward end which extends beyond the aligned inboard and outboard leading edges of the inboard and outboard portions of the aircraft wing, respective, when the slat is in the retracted position thereof.

* * * * *